US008329238B2

(12) United States Patent
Vanrietvelde et al.

(10) Patent No.: US 8,329,238 B2
(45) Date of Patent: Dec. 11, 2012

(54) COOLING COMPOSITION

(75) Inventors: Claude Vanrietvelde, Saint-Julien-en-Genevois (FR); Anh Le, Middletown, DE (US); Jérôme Barra, Neydens (FR)

(73) Assignee: Firmenich SA, Geneva (CH)

( * ) Notice: Subject to any disclaimer, the term of this patent is extended or adjusted under 35 U.S.C. 154(b) by 935 days.

(21) Appl. No.: 11/524,756

(22) Filed: Sep. 20, 2006

(65) Prior Publication Data
US 2007/0014888 A1 Jan. 18, 2007

Related U.S. Application Data

(63) Continuation of application No. PCT/IB2005/000951, filed on Apr. 12, 2005.

(30) Foreign Application Priority Data

Apr. 14, 2004 (EP) .................................... 04101518

(51) Int. Cl.
*A23L 1/221* (2006.01)
*A23G 4/00* (2006.01)
(52) U.S. Cl. .............................. 426/533; 426/3; 426/534
(58) Field of Classification Search .................... 426/534
See application file for complete search history.

(56) References Cited

U.S. PATENT DOCUMENTS

| 4,820,544 | A | 4/1989 | Barcelon et al. ............... 426/660 |
| 6,048,549 | A | 4/2000 | Nitikhunkasem et al. .... 424/489 |
| 6,231,900 | B1 * | 5/2001 | Hanke ............................. 426/96 |
| 6,322,838 | B1 * | 11/2001 | Guntert et al. ................ 426/534 |
| 6,537,595 | B1 * | 3/2003 | Hyodo et al. ..................... 426/3 |
| 6,627,233 | B1 | 9/2003 | Wolf et al. ......................... 426/3 |
| 2002/0090445 | A1 | 7/2002 | Alani et al. .................... 426/650 |
| 2003/0215532 | A1 * | 11/2003 | Nakatsu et al. ............... 424/734 |

FOREIGN PATENT DOCUMENTS

| EP | 0 988 852 A2 | 3/2000 |
| JP | 04023967 | 1/1992 |
| JP | 2004018829 | 1/2004 |

OTHER PUBLICATIONS

Yang, X., Eilerman, R.G. 1999. Pungent Principal of *Alpinia galangal* (L.) Swartz and Its Applications. J. Agric. and Food Chem. vol. 47. pp. 1657-1662.*
Rao, B.R.R., Kaul, P.N., Syamasundar., K.V., Ramesh, S. 2003. "Comparative composition of decanted and recovered essential oils of *Eucalyptus citriodora* Hook." Flavor and Fragrance Journal. vol. 18. pp. 133-135.*
Article: Rao B R. Rjeswara et al., XP002301637, "Comparative Composition of Decanted and Recovered Essential Oils of *Eucalyptus citriodora* Hook," Flavour and Fragrance Journal, vol. 18, No. 2 (2003).
Article: Rao B R. Rjeswara et al., XP002301637, "Comparative Composition of Decanted and Recovered Essential of Is of *Eucalyptus citriodora* Hook", (2003).

* cited by examiner

*Primary Examiner* — Nikki H Dees
(74) *Attorney, Agent, or Firm* — Wiston & Strawn LLP

(57) ABSTRACT

Novel cooling compositions having a natural status are object of the present invention. These compositions comprise a combination of menthol, together with a nature identical ingredient and at least one natural extract. They can be added to flavoring compositions to impart cooling sensations devoid of mentholic flavoring notes.

22 Claims, No Drawings

COOLING COMPOSITION

CROSS-REFERENCE TO RELATED APPLICATIONS

This application is a continuation of International application PCT/IB2005/000951 filed on 12 Apr. 2005, the entire content of which is expressly incorporated herein by reference thereto.

TECHNICAL FIELD

The present invention relates to the flavor industry. It concerns more particularly a novel cooling composition which can be added to flavoring compositions or edible products to impart a cooling effect to the latter. The composition of the invention presents the double advantage of providing a cooling effect while not imparting strong mentholic flavoring notes to the composition to which it is added and it is, besides, entirely natural.

BACKGROUND ART

Ingredients capable of providing trigeminal effects, such as cooling effects, constitute compounds of paramount importance in the flavor industry. Cooling agents are usually described as providing cold or cool sensations when contacted with the human body and, in particular, with the mucus membranes of the mouth, nose and throat. These ingredients are widely used in edible products, drinks, dentifrices, gargles, but also in cosmetics, tobacco products, abrasives or lotions. Menthol or (−)-(1R,2S,5R)-3-p-menthanol has been widely described and used as a cooling agent. However, in addition to its cooling effect, the latter compound presents the drawback of having an astringent bitter taste with a typical mentholic aftertaste, in particular when used at high dosages in applications. This property limits its use in compositions or products which have dominant non-minty flavor tonalities, such as fruit flavored applications.

This particular problem associated with the use of menthol has been already tackled in the prior art. In particular U.S. Pat. No. 6,627,233 addresses the problem of using peppermint oil which mainly comprises menthol, and which imparts peppermint notes in non-peppermint flavored products. More particularly, this document outlines that menthol presents strong mentholic flavoring notes and "harsh notes" defined as a bitter, harsh and burning taste. This statement is made within the framework of applications in chewing gums and the document suggests, as a solution to this problem, the use of an association of menthol with menthone and a so-called "physiological cooling agent" selected from the group consisting of menthyl succinate, acyclic carboxamide, menthyl lactate, 3-1-menthoxypropane-1,2-diol, N-substituted p-menthane carboxamide, menthone glycerol ketals and mixtures thereof. However, the latter agents are all artificial cooling ingredients, and are consequently of limited use in terms of dosage in particular in confectionery, beverage or savoury applications due to their non-natural status.

Therefore, in view of the existing prior art, there is a need to develop cooling compositions that do not raise legal issues and that can be used in no limited dosages, in a wide range of applications.

The present invention overcomes the above-mentioned problems by providing a novel composition which develops excellent cooling sensations without mentholic detrimental notes, said composition being at the same time entirely natural.

SUMMARY OF THE INVENTION

The present invention first consists of a natural cooling composition, i.e. a composition capable of imparting a cooling effect to a flavoring composition or to an edible product to which it is added, comprising an association of (−)-(1R,2S,5R)-3-p-menthanol together with (−)-(1R,2S,5R)-3-p-menthen-3-ol or another nature-identical cooling ingredient, and an effective amount of at least one natural extract imparting a trigeminal effect to the composition.

Flavoring compositions and ready-to-consume edible products comprising, together with a flavoring base, a cooling composition as defined above, are also objects of the invention, as well as methods to impart, enhance or modify the cooling effect of a composition or product, comprising the addition of a composition according to the invention to said flavoring composition or edible product.

The first object of this invention is thus a natural cooling composition comprising 0.1 to 49.9% by weight of (−)-(1R,2S,5R)-3-p-menthanol; 0.1 to 49.9% by weight of a nature identical cooling ingredient, in particular (−)-(1R,2S,5R)-8-p-menthen-3-ol; and 0.1 to 49.9% by weight of at least one natural extract capable of imparting a trigeminal effect to the composition. Percentages are given by weight relative to the total weight of the composition.

The compositions object of this invention are advantageously free of any artificial cooling ingredient such as those used in the prior art. The natural status of these compositions prevents them from raising legal issues and consequently allows them to be used in unlimited dosages in a wide range of applications.

Turning to their organoleptic properties, the compositions of the invention provide to the compositions to which they are added an excellent cooling sensation with a long lasting effect, devoid of any mentholic aftertaste. Consequently, they can advantageously be used in combination of any type of flavor tonality in particular with fruity-type tonalities.

Therefore, this novel combination of three particular ingredients, in addition to be completely natural, advantageously imparts a cooling effect to the compositions or products to which it is added, while not imparting a strong minty or harsh tonality usually associated with the use of menthol. Besides, the compositions of the invention are acceptable worldwide due to their natural status and can be applied in any kind of application, and not only in menthol type products, which means they can be used in areas as varied as confectionary, pharmaceutical, dairy, soy-based products, beverages or savoury products.

Other benefits and advantages will become apparent through the detailed description and the examples given below.

DETAILED DESCRIPTION OF THE PREFERRED EMBODIMENTS

Menthol is the first essential ingredient of the composition of the invention. Although known to naturally impart mentholic flavoring notes, this ingredient is now advantageously associated with two other specific ingredients, so as to impart a cooling effect, while having its natural tonalities attenuated. Menthol is used in amounts comprised between 0.1 and 49.9% by weight relative to the total weight of the composition.

The second ingredient used in the composition according to the invention, namely (−)-(1R,2S,5R)-8-p-menthen-3-ol, is a nature identical cooling ingredient. It is commercially available under the tradename Isopulegol™ Tak Pil or Coolact P™ from Takasago. This ingredient is used in the composition of the invention in proportions varying between 0.1 and 49.9% and preferably between 0.1 and 19.9% by weight relative to the total weight of the composition. Alternatively to (−)-(1R,2S,5R)-8-p-menthen-3-ol, another cooling ingredient possessing the nature identical status could be used.

The last essential ingredient of the composition is at least one natural extract derived from extraction techniques, with a purity level necessary to impart a trigeminal effect to the composition. What is meant here by trigeminal effect, is a sensation associated with taste or touch senses and which affects the trigeminal nerve. Trigeminal effects encompass sensations such as cooling, refreshing, tingling, salivating, biting, hot, warm, pungent, sweet, sour, astringent and the like for the most used in the food industry. The natural extract suitable for the purpose of the invention is used in proportions varying between 0.1 and 49.9% and preferably between 0.1 and 19.9% by weight relative to the total weight of the composition. In a particular embodiment the natural extract is selected from the group consisting of jambu oleoresin, jawa galanga oleoresin, maniguette oleoresin or grains of paradise, cardamom oleoresin, ginger oleoresin, pepper oleoresin, sage oleoresin, cubebe and mixtures thereof. These extracts are commercially available.

According to a preferred embodiment of the present invention, the ratio between (−)-(1R,2S,5R)-3-p-menthanol and the natural extract is comprised between 4:1 and 1:6. Preferably, the ratio is comprised between 3:1 and 1:3. For example, it is 1:2. Preferably, the ratio between (−)-(1R,2S,5R)-8-p-menthen-3-ol and the natural extract is comprised between 4:1 and 6:4.

The cooling composition of the invention can advantageously be added to a flavoring composition in order to impart a cooling sensation to the latter. By "flavoring composition", it is meant here a mixture of flavoring ingredients, solvents or adjuvants of current use for the preparation of a flavoring formulation, i.e. a particular mixture of ingredients which is intended to be added to an edible composition to impart, improve of modify its organoleptic properties, in particular its odor, flavor and/or taste. Flavoring ingredients are well known to a person skilled in the art and their nature does not warrant a detailed description here, which in any case would not be exhaustive, the skilled person being able to select them on the basis of his general knowledge and according to the intended use or application and the organoleptic effect it is desired to achieve. Many of these flavoring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, van Nostrand Co., Inc. Solvents and adjuvants of current use for the preparation of a flavoring formulation are also well known in the art. They allow flavoring formulations to meet technical requirements, such as stability or tonality persistence. The solvent is most of the time part of a flavoring composition. Solvents currently used in this framework include for instance benzyl alcohol, propylene glycol, triacetine, vegetable oils, ethanol or limonene. The adjuvants, on the other hand, can have many various functions in a flavoring composition. They include, for instance, stabilizers. Today, the range of products types and product formulations that are flavored has become so extensive and subjected to frequent changes that an approach made on a product-by-product basis and on the definition for each case of the adjuvants that can be used is impractical. This is why a list of adjuvants currently used in flavoring formulations is not given here. However, a skilled person in the art, namely a flavorist is capable of choosing these ingredients as a function of the product to be flavored and of the nature of the flavoring ingredients contained in the formulation.

On the other hand, the composition of the invention can also be directly added to a ready-to-consume or end-product. In other words, it can either be initially added to a flavoring composition as defined above, the resulting composition then being added to an end-product, or it can be added independently of a flavoring composition to an edible product.

The composition of the invention can be used in various forms. In a first embodiment, the mixture of the three essential ingredients is used in liquid form and can thus be added either to a liquid flavoring composition as defined above, or directly to an edible composition.

In a second embodiment, the composition of the invention can advantageously be used in an encapsulated form, i.e. in the form of a solid particulate composition, powder or granules like, which can then be added to other powdered solid ingredients to form a dry blend. Here again, the composition to be encapsulated can either simply consists of the cooling mixture object of the invention, or consists of a more complex flavoring composition comprising the cooling mixture defined above.

The encapsulation processes by which the composition of the invention, optionally in admixture with a flavoring composition can be protected, can consist in spray-drying, agglomerating or extruding techniques, all of which lead to matrix-type structures. On the other hand, the process may consist of a coating encapsulation, such as coacervation and complex coacervation, which lead to core-shell-type structures.

Carrier materials suitable for matrices are wall-forming and plasticizing materials such as mono, di- or trisaccharides, natural or modified starches, hydrocolloids, cellulose derivatives, polyvinyl acetates, polyvinylalcohols, proteins or pectins. Example of particularly useful matrix materials include sucrose, glucose, lactose, levulose, fructose, maltose, ribose, dextrose, sorbitol, mannitol, xylitol, lactitol, maltitol, pentatol, arabinose, pentose, xylose, galactose, maltodextrin, dextrin, chemically modified starch, hydrogenated starch hydrolysate, succinylated or hydrolysed starch, agar, carrageenan, gum arabic, gum accacia, tragacanth, alginates, methyl cellulose, carboxymethyl cellulose, hydroxyethyl cellulose, hydroxypropylmethyl cellulose, derivatives and mixtures thereof.

On the other hand, coating encapsulation is typically based on the use of thin xerogel carrier systems including gelatin, agar and alginate.

Other suitable carrier ingredients are cited in reference texts such as H. Scherz, Hydrokolloids: stabilisatoren, Dickungs-und Gehermittel in Lebensmittel, Band 2 der Schriftenreihe Lebensmittelchemie, Lebensmittelqualität, Behr's VerlagGmbH & Co., Hamburg, 1996. The cited materials are hereby given by way of example and are not to be interpreted as limiting the invention.

The powder or granular form of the cooling composition or flavoring composition containing the cooling mixture of the invention, may advantageously be used for the preparation of powdered edible products.

The compositions of the invention are used to provide cooling sensations to the product to which they are added. The use of a composition of the invention, to impart, enhance or modify the cooling effect of a composition or product to which it is added is thus an object of the invention.

The cooling compositions of the invention can be used to modify the organoleptic properties of edible end-products belonging to food segments as varied as confectionery, beverages or savoury. More particularly, the composition of the invention can be used in products such as chewing gums, sugar almonds, compressed tablets, hard-boiled candies, chewing candies, and the like for the confectionery field. In the case of beverages, they are suitable to impart cooling effects to carbonated and non-carbonated beverages, alcoholic beverages and the like, as well as to dairy applications such as milk drinks, fruit and milk flavored acidic drinks, yoghurts and the like.

The compositions of the invention can also be used to impart cooling sensations in savoury applications, such as dry-blended seasonings, spices, soups, cheeses, butter spreads and the like.

These examples should not be interpreted as limiting the invention. More particularly, the cooling compositions of the invention can easily be used in the fragrance field, in applications wherein it is desired to have a cooling effect, such as in creams, ointments, shampoos, soaps and the like.

The proportions in which the compositions according to the invention can be incorporated into the aforementioned end-products vary within a wide range of values. These values depend on the nature of the ready-to-consume product and the nature of the flavoring composition used in said product, as well as on the intensity of the cooling effect it is desired to achieve.

In particular, in the case of edible products, wherein the compositions of the invention are added in liquid form, they will be present in amounts typically varying from 0.1 to 10% by weight relative to the total weight of the edible composition to which they are added. When the compositions of the invention are used in an encapsulated form, they are preferably added in proportions typically comprised between 0.1 and 5% by weight relative to the total weight of the edible composition to which they are added.

EXAMPLES

The invention will now be illustrated by way of the following examples but is not limited to these examples. Temperatures are given in degrees centigrade and abbreviations have the meaning common in the art.

Example 1

Comparative Example in a Chewing Gum Application

A chewing gum base having the following composition was used to compare various flavoring systems:

| Ingredient | Parts by weight |
| --- | --- |
| BALEAR ® T[1] | 22.00 |
| Crystalline sorbitol powder | 57.70 |
| Citric acid | 1.00 |
| Maltitol syrup at 75% solids | 12.00 |
| Glycerine | 3.00 |
| Sorbitol syrup at 77-78% solids | 4.00 |
| ASPARTAME ® | 0.10 |
| Acesulfame potassium | 0.20 |
| Total | 100.00 |

[1]origin: Cafosa Gum Base, Spain

Crystalline sorbitol, citric acid, acesulfame potassium and ASPARTAME® were blended in a TURBULA® blender in the proportions indicated above. Half the blend was mixed in a pre-warmed BALEAR® T gum base in a Winkworth sigma-blade mixer at 50-55° for 5 minutes. The remaining powder blend was then added along with a humectant syrup (maltitol syrup, sorbitol syrup, glycerine) and mixed for a further 5 minutes.

Three flavoring compositions were prepared with following ingredients:

Composition A

Liquid lemon flavor (ref. 506060 T; origin Firmenich SA, Geneva, Switzerland)

Composition B

| Ingredients | Parts by weight |
| --- | --- |
| Menthol | 20.0 |
| COOLACT ®[1] | 3.0 |
| Jambu oleoresin[2] | 0.5 |
| Jawa Galanga oleoresin[3] | 0.5 |
| Lemon flavor[4] | 76.0 |
| Total | 100.0 |

[1]origin: Takasago, Japan
[2]origin: Robertet, France
[3]origin: Robertet, France
[4]ref 506060 T; origin: Firmenich SA, Geneva, Switzerland Composition C

| Ingredients | Parts by weight |
| --- | --- |
| Maltodextrin 18DE | 85 |
| Composition B | 10 |
| Water | 5 |
| Total | 100 |

The ingredients mentioned in Composition C were mixed together so as to produce a dry blend. This powder blend was then extruded with water as plasticizer, through a die hole using a twin screw extruder equipped with a cutter knife allowing to chop the melt at the die exit while it is still plastic. A low water content was needed to guarantee a glass transition above 40° C. at constant sample composition.

Each flavoring systems, namely compositions A, B and C respectively, was added to a chewing gum base at flavor iso-load and mixed for 2 minutes with the following dosages:

| Sample | Flavor load in the composition | Dosage in the application |
| --- | --- | --- |
| Composition A | 100% | 1.00% |
| Composition B | 100% | 1.00% |
| Composition C | 6.40% | 0.75% |

The chewing gums samples prepared were tested by 20 panellists. Chewing gum samples flavored with compositions B and C were identified as imparting a fresher and cooling lemon flavor boosting devoid of any mentholic note, immediately after first chew. The cooling lemon perception built-up over a total time of 10 minutes chewing. The lasting of cooling sensation provided by chewing gum samples flavored with compositions B and C was determined to be longer than in chewing gum flavored with composition A.

Example 1 was repeated with the same chewing gum base composition, but changing the lemon flavor in compositions A, B and C for an orange flavor and then a strawberry flavor respectively. Similar comments were made by the panellists.

Example 2

Comparative Example in a Hard-boiled Candy Application

A hard-boiled candy base was used to compare various flavoring systems. Glucose syrup 42 DE (20%) and sucrose syrup 65 Brix (80%) were mixed and heated to 145° in a copper pan. Then, the pan was removed from the gas frame and placed in a warm water bath. Buffered citric acid 50% solution (1.85%) was added and followed by the addition of the flavoring systems described in Example 1, namely Compositions A, B and C when temperature reached 130° C. The cooked mass was then poured at ambient temperature into appropriate TEFLON® molds.

| Sample | Flavor load in the composition | Dosage in the application |
|---|---|---|
| Composition A | 100% | 0.20% |
| Composition B | 100% | 0.20% |
| Composition C | 6.40% | 0.75% |

The lemon flavor was then replaced by an orange flavor and then a strawberry flavor respectively. Hard-boiled candies were flavored with compositions A, B and C at flavor iso-load.

The comments from the panellists were the following: Hard-boiled candy samples flavored with compositions B and C were fresher and had a cooling flavor sensation compared with sample flavored with composition A. The cooling flavored perception built up over the total time of tasting. The lasting of cooling sensation of hard-boiled candy samples flavored with compositions B and C was determined to be longer than the one flavored with composition A.

Example 3

Comparative Example in a Hard-boiled Candy Application

A hard-boiled candy base was used to compare various flavoring systems. Glucose syrup 42 DE (20%) and sucrose syrup 65 Brix (80%) were mixed and heated to 145° in a copper pan. Then, the pan was removed from the gas frame and placed in a warm water bath. Buffered citric acid 50% solution (1.85%) was added and followed by the addition of flavoring systems described below when temperature reached 130° C. The cooked mass was then poured at ambient temperature into appropriate TEFLON® molds.

Four flavoring compositions were prepared with the following ingredients:

Composition W

Liquid strawberry flavor (ref 506061 T; origin Firmenich SA, Geneva, Switzerland Composition X

| Ingredients | Parts by weight |
|---|---|
| Menthol | 15.0 |
| Glycerol triacetate | 3.0 |
| Strawberry flavor[1] | 82.0 |
| Total | 100.0 |

[1]ref 506061 T; origin: Firmenich SA, Geneva, Switzerland

Composition Y

| Ingredients | Parts by weight |
|---|---|
| Menthol | 15.0 |
| COOLACT ®[1] | 2.0 |
| Jambu oleoresin[2] | 0.7 |
| Cardamom oleoresin[3] | 0.3 |
| Strawberry flavor[4] | 82.0 |
| Total | 100.0 |

[1]origin: Takasago, Japan
[2]origin: Robertet, France
[3]origin: Kalsec Inc., USA
[4]ref 506061 T; origin: Firmenich SA, Geneva, Switzerland Composition Z

| Ingredients | Parts by weight |
|---|---|
| Maltodextrin 18DE | 85 |
| Composition Y | 10 |
| Water | 5 |
| Total | 100 |

The ingredients of Composition Z were mixed together so as to produce a dry blend. This powder blend was then extruded with water as plasticizer, through a die hole using a twin screw extruder equipped with a cutter knife allowing to chop the melt at the die exit while it was still plastic. A low water content was needed to guarantee a glass transition above 40° at constant sample composition.

Each flavoring systems, namely compositions W, X, Y and Z respectively, was applied to the hard-boiled candy samples with the following dosages:

| Sample | Flavor load | Dosage |
|---|---|---|
| Composition W | 100% | 0.12% |
| Composition X | 100% | 0.12% |
| Composition Y | 100% | 0.12% |
| Composition Z | 4.4% | 0.75% |

The strawberry flavor was then replaced by an orange and then a lemon flavor. Compositions W, X, Y and Z were applied in hard-boiled candy samples at iso-load.

The comments from the panellists were the following: hard-boiled candy sample flavored with compositions X was initially fresh, then started cooling with mentholic flavoring notes that continued to build up over the total time of tasting. Hard-boiled candy samples flavored with compositions Y and Z were fresher and had a cooling flavor without metholic flavoring notes. The cooling flavored perception built up over the total time of tasting. The lasting of cooling sensation of hard-boiled candy samples with compositions Y and Z was determined to be better and more preferred than the hard-boiled candy samples with compositions X and W.

What is claimed is:

1. A composition consisting essentially of:

a) 15 to 49.9% by weight relative to the total weight of the composition of (−)-(1R,2S,5R)-3-p-menthanol as a first cooling ingredient;

b) 0.1 to 19.9% by weight relative to the total weight of the composition of (−)-(1R,2S,5R)-8-p-menthen-3-ol as a second cooling ingredient; and c) at least one natural extract(s) comprising jambu oleoresin, wherein the composition provides a cooling effect to and removes any mentholic taste from an edible composition to which it is added, and wherein the edible composition includes fruity flavor notes, and wherein the ratio between (−)-(1R,2S,5R)-8-p-menthen-3-ol and the natural extract is comprised between 4:1 and 6:4, wherein the ratio between (−)-(1R,2S,5R)-3-p-menthanol and the natural extract is comprised between 20:1 and 15:1.

2. A flavoring composition, wherein said flavouring composition comprises the composition according to claim 1 together with a flavor base consisting of flavoring ingredients, and a solvents selected from the group consisting of benzyl alcohol, propylene glycol, triacetine, vegetable oils, ethanol and limonene, and wherein the flavoring composition includes fruity flavor notes and a cooling effect is provided to the flavoring composition without imparting any mentholic taste.

3. The composition according to claim 2, wherein the flavor base comprises at least one flavoring ingredient imparting minty and, or, fruity flavor notes.

4. A ready-to-consume product wherein said product comprises, as part of an edible composition, the composition according to claim 1.

5. The product according to claim 4, in the form of a chewing gum, a hard boiled candy, a compressed tablet, a chewy candy, an effervescent tablet, an acidified milk drink, a yoghurt, a fruit preparation, a soy based product, a carbonated or non carbonated beverage, a tea based drink, an alcoholic beverage, a powder drink, a powdered soup, a seasoning, a spices mixture, a cheese or a butter spread.

6. The composition according to claim 1, wherein said composition is in a powdered or granular form.

7. The composition according to claim 1, wherein the at least one natural extract(s) further includes a jawa galanga oleoresin, a maniguette oleoresin, a cardamom oleoresin, a ginger oleoresin, a pepper oleoresin, a sage oleoresin, or a cubebe in addition to the jambu oleoresin.

8. The composition according to claim 7, wherein the at least one natural extract(s) is the combination of jambu oleoresin and jawa galanga oleoresin.

9. The composition according to claim 7, wherein the at least one natural extract(s) is the combination of jambu oleoresin and cardamom oleoresin.

10. The composition according to claim 1, wherein the ratio between (−)-(1R,2S,5R)-8-p-menthen-3-ol and the natural extract is comprised between 3:1 and 2:1.

11. The composition according to claim 2, wherein the ratio between (−)-(1R,2S,5R)-8-p-menthen-3-ol and the natural extract is comprised between 3:1 and 2:1.

12. A composition consisting of:
a) 15 to 49.9% by weight relative to the total weight of the composition of (−)-(1R,2S,5R)-3-p-menthanol as a first cooling ingredient;

b) 0.1 to 19.9% by weight relative to the total weight of the composition of (−)-(1R,2S,5R)-8-p-menthen-3-ol as a second cooling ingredient; and c) at least one natural extract(s) comprising jambu oleoresin, wherein the composition provides a cooling effect to and removes any mentholic taste from an edible composition to which it is added, and wherein the edible composition includes fruity flavor notes, and wherein the ratio between (−)-(1R,2S,5R)-8-p-menthen-3-ol and the natural extract is comprised between 4:1 and 6:4, wherein the ratio between (−)-(1R,2S,5R)-3-p-menthanol and the natural extract is comprised between 20:1 and 15:1.

13. A flavoring composition, wherein said flavouring composition comprises the composition according to claim 12 together with a flavor base consisting of flavoring ingredients, and a solvent selected from the group consisting of benzyl alcohol, propylene glycol, triacetine, vegetable oils, ethanol and limonene, and wherein the flavoring composition includes fruity flavor notes and a cooling effect is provided to the flavoring composition without imparting any mentholic taste.

14. The flavoring composition according to claim 13, wherein the flavor base comprises at least one flavoring ingredient imparting minty and, or, fruity flavor notes.

15. A ready-to-consume product wherein said product comprises, as part of an edible composition, the composition according to claim 12.

16. The product according to claim 15, in the form of a chewing gum, a hard boiled candy, a compressed tablet, a chewy candy, an effervescent tablet, an acidified milk drink, a yoghurt, a fruit preparation, a soy based product, a carbonated or non carbonated beverage, a tea based drink, an alcoholic beverage, a powder drink, a powdered soup, a seasoning, a spices mixture, a cheese or a butter spread.

17. The composition according to claim 12, wherein said composition is in a powdered or granular form.

18. The composition according to claim 12, wherein the at least one natural extract(s) further includes a jawa galanga oleoresin, a maniguette oleoresin, a cardamom oleoresin, a ginger oleoresin, a pepper oleoresin, a sage oleoresin, or a cubebe in addition to the jambu oleoresin.

19. The composition according to claim 18, wherein the at least one natural extract(s) is the combination of jambu oleoresin and jawa galanga oleoresin.

20. The composition according to claim 18, wherein the at least one natural extract(s) is the combination of jambu oleoresin and cardamom oleoresin.

21. The composition according to claim 12, wherein the ratio between (−)-(1R,2S,5R)-8-p-menthen-3-ol and the natural extract is comprised between 3:1 and 2:1.

22. The composition according to claim 13, wherein the ratio between (−)-(1R,2S,5R)-8-p-menthen-3-ol and the natural extract is comprised between 3:1 and 2:1.

* * * * *

UNITED STATES PATENT AND TRADEMARK OFFICE
CERTIFICATE OF CORRECTION

PATENT NO. : 8,329,238 B2
APPLICATION NO. : 11/524756
DATED : December 11, 2012
INVENTOR(S) : Vanrietvelde et al.

Page 1 of 1

It is certified that error appears in the above-identified patent and that said Letters Patent is hereby corrected as shown below:

<u>Column 9:</u>
Line 17 (claim 2, line 4), delete "solvents" and insert -- solvent --.

Signed and Sealed this
Nineteenth Day of February, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,329,238 B2 | Page 1 of 1 |
| APPLICATION NO. | : 11/524756 | |
| DATED | : December 11, 2012 | |
| INVENTOR(S) | : Vanrietvelde et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1113 days.

Signed and Sealed this
Eleventh Day of November, 2014

Michelle K. Lee
*Deputy Director of the United States Patent and Trademark Office*